United States Patent
Fujiwara et al.

(10) Patent No.: US 7,473,038 B2
(45) Date of Patent: Jan. 6, 2009

(54) OPTICAL CONNECTOR FOR COUPLING AN OPTICAL FIBER TO A CIRCUIT BOARD

(75) Inventors: Kunihiko Fujiwara, Sakura (JP); Akito Nishimura, Sakura (JP); Kenji Sasaki, Sakura (JP); Yukio Hayashi, Sakura (JP); Ichiro Hatakeyama, Tokyo (JP); Youichi Hashimoto, Tokyo (JP); Junichi Sasaki, Tokyo (JP); Ryosuke Kuribayashi, Tokyo (JP); Kazunori Miyoshi, Tokyo (JP); Kazuhiko Kurata, Tokyo (JP)

(73) Assignees: Fujikura Ltd., Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 11/437,646

(22) Filed: May 22, 2006

(65) Prior Publication Data

US 2006/0280410 A1 Dec. 14, 2006

(30) Foreign Application Priority Data

May 25, 2005 (JP) ............................. 2005-152347

(51) Int. Cl.
G02B 6/36 (2006.01)

(52) U.S. Cl. ............................. 385/88; 385/89; 385/92

(58) Field of Classification Search ............. 385/88–94
See application file for complete search history.

(56) References Cited

U.S. PATENT DOCUMENTS

2003/0091301 A1 * 5/2003 Lee et al. ..................... 385/89

FOREIGN PATENT DOCUMENTS

| JP | 6-273641 | 9/1994 |
|----|----------|--------|
| JP | 09-152526 A | 6/1997 |
| JP | 2001-36197 A | 2/2001 |
| JP | 2003-207694 A | 7/2003 |

* cited by examiner

*Primary Examiner*—Frank G Font
*Assistant Examiner*—Michael P Mooney
(74) *Attorney, Agent, or Firm*—Sughrue Mion, PLLC (57) ABSTRACT

An optical connector according to the present invention including a connector body mounted on an optical module mounted on a circuit board, and a connector fixing member for pressing the connector body against the optical module. The connector fixing member can be engaged/disengaged with/from the circuit board, and thus the connector body can be attached/detached to/from the optical module.

10 Claims, 9 Drawing Sheets

OPTICAL CONNECTOR FOR COUPLING AN OPTICAL FIBER TO A CIRCUIT BOARD

BACKGROUND OF THE INVENTION

1. Field of the Invention

The present invention relates to an optical connector in which a connector body provided at the tip of an optical fiber is positioned such that it is optically connectable to an optical input/output end, and mounted on a board such as a circuit board, on which the optical input/output end, such as a lighting device, light-receiving device, optical fiber end, is mounted.

This application claims priory based on Japanese Patent Application No. 2005-152347, filed on May 25, 2005, the entire contents of which are incorporated herein by reference.

BACKGROUND ART

Currently, an optical transceiver used for an optical LAN (Local Area Network) system, etc., is typically used, in which an optical axis of a light-emitting device such as a semiconductor laser or a light-receiving device such as a photodiode is made to be parallel with a surface direction (extending direction) of a circuit board and an optical connector is attached to an end of the circuit board or a lead frame, on which these optical devices are mounted, to be connected to an outer optical fiber. A well-known single-fiber (e.g. MU type or SC type) optical ferrule or multi-fiber (e.g. MT type and MINI-MT type) optical fertile is employed as a ferrule of the optical connector used for the optical transceiver. Such optical transceivers having each ferrule have already been standardized.

On the other hand, with the recent increase in demand for a combined optical and electrical circuit or mixed optical and electrical board, there has arisen a problem in that the degree of freedom in designing an optical connecting path or circuit board is limited owing to various limitations to a mounting position of the optical connector of the optical transceiver having such a connecting method in which the optical axis is made to be parallel with the surface direction of the board.

Additionally, there exists a problem in that the board cannot be miniaturized. (See, e.g., Japanese Unexamined Patent Application, First Publication No. 6-273641)

In view of the above problems, the object of the present invention is to provide an optical connector in which the sue can be downsized for attaching an optical connector (connector body) to a board (circuit board etc.,) to which an optical input/output end is mounted, the connector body can be easily to the board, the degree of freedom in design regarding mounting position of the connector body to the board is improved, positioning of the connector body to the optical input/output end is improved, and position accuracy can be stably maintained for a long period

SUMMARY OF THE INVENTION

The present invention provides an optical connector which can be attached/detached to/from the board or the engaging member by engagement/disengagement of the engaging parts with/from the board or the member including: a board; an optical input/output end which is directly or indirectly mounted on the board and has an optical axis tilted with respect to the board; a connector body attached to he tip of an optical fiber; and a connector fixing member for pressing the connector body provided on the board made to face the optical input/output end against the optical input/output end, wherein; an optical axis-converting part forming an optical path for optically connecting the tip of the optical fiber to the optical input/output end is built in the connector body so as to face the tip of the optical fiber fixed to the connector body in a direction parallel with a joint surface made to face the optical input/output end and the optical input/output end; and the connector fixing member has a pressing part press against a back surface on the reverse side of the joining surface of the connector body and engaging parts engaged/disengaged with/from the board or an engaging member fixed to the board.

In the optical connector of the present invention, it is preferable that the connector fixing member be a fame body including a fixing member body having a beam part arranged along the back surface of the connector body and the pressing part provided on the beam part, and elastic engaging pieces projected on the side of the fixing member body as the end part.

In the optical connector of the present invention, it is preferable that the fixing member be a gate-shaped frame body including the beam part and the elastic engaging pieces projecting from both the ends of the beam part as the engaging part.

In the optical connector of the present invention, it is preferable that a plurality of engaging holes, through which the elastic engaging pieces can be engaged/disengaged wisdom the board, be formed in the board so as to surround both sides of the optical input/output end or the optical input/output end.

In the optical connector of the present invention, it is preferable that the beam part be formed in a cured or bent shape, is an elastic spring body for being pressed against the back surface of the connector body, and functions as a pressing part In the optical connector of the present invention, it is preferable that an elastic body be attached to the beam part.

In the optical connector of the present invention, it is preferable that a pressing part, which is a projected piece-shaped elastic piece, be projected on the fixing member body.

In the optical connector of the present invention, it is preferable tat the engaging member fixed to the board have a socket function for detachably holding an optical module attachable/detachable to/from the board.

In the optical connector of the present invention, it is preferably structured so that positioning pins fixed to either the board or a positioning member fixed to the board, or the connector body, are inserted into and engaged with pin holes formed in the other side, respectively, so that the connector body can be positioned at the optical input/output end.

DESCRIPTION OF PREFERRED EMBODIMENTS

Figure 1:
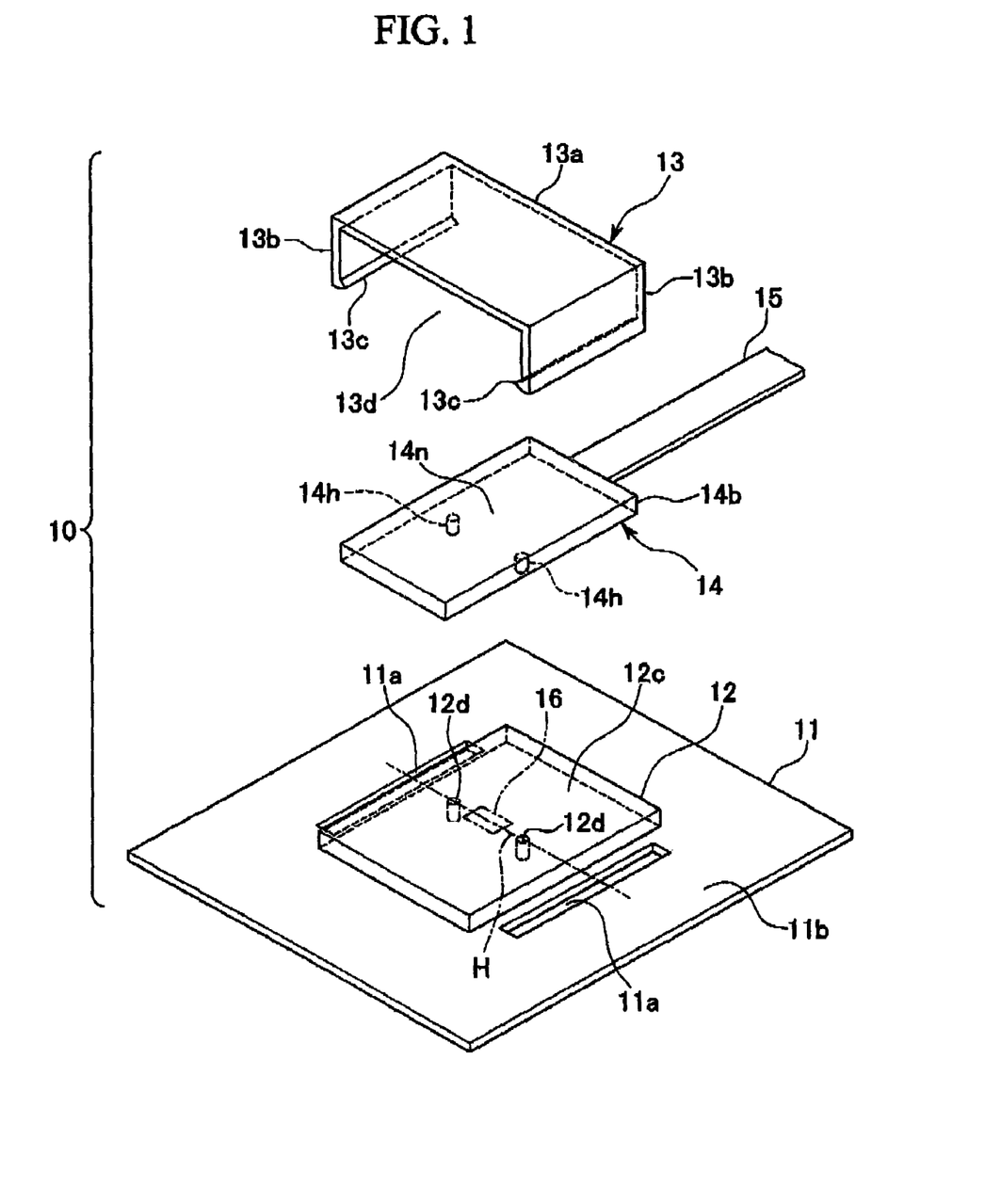
FIG. 1 is an exploded perspective view showing the structure of an optical connector according to the present invention.
Figure 2A:
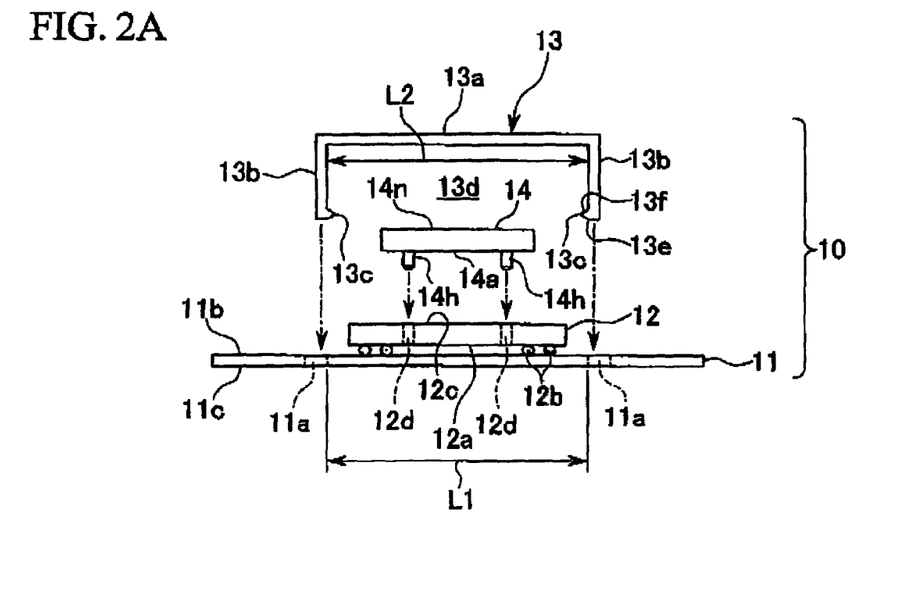
FIG. 2A is an exploded front view of the optical connector of FIG. 1.
Figure 2B:
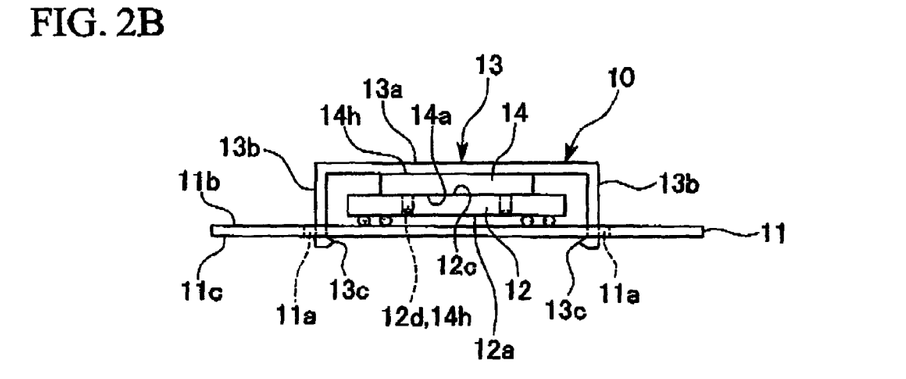
FIG. 2B is a front view showing a state where the optical connector of FIG. 1 is assembled.
Figure 3:
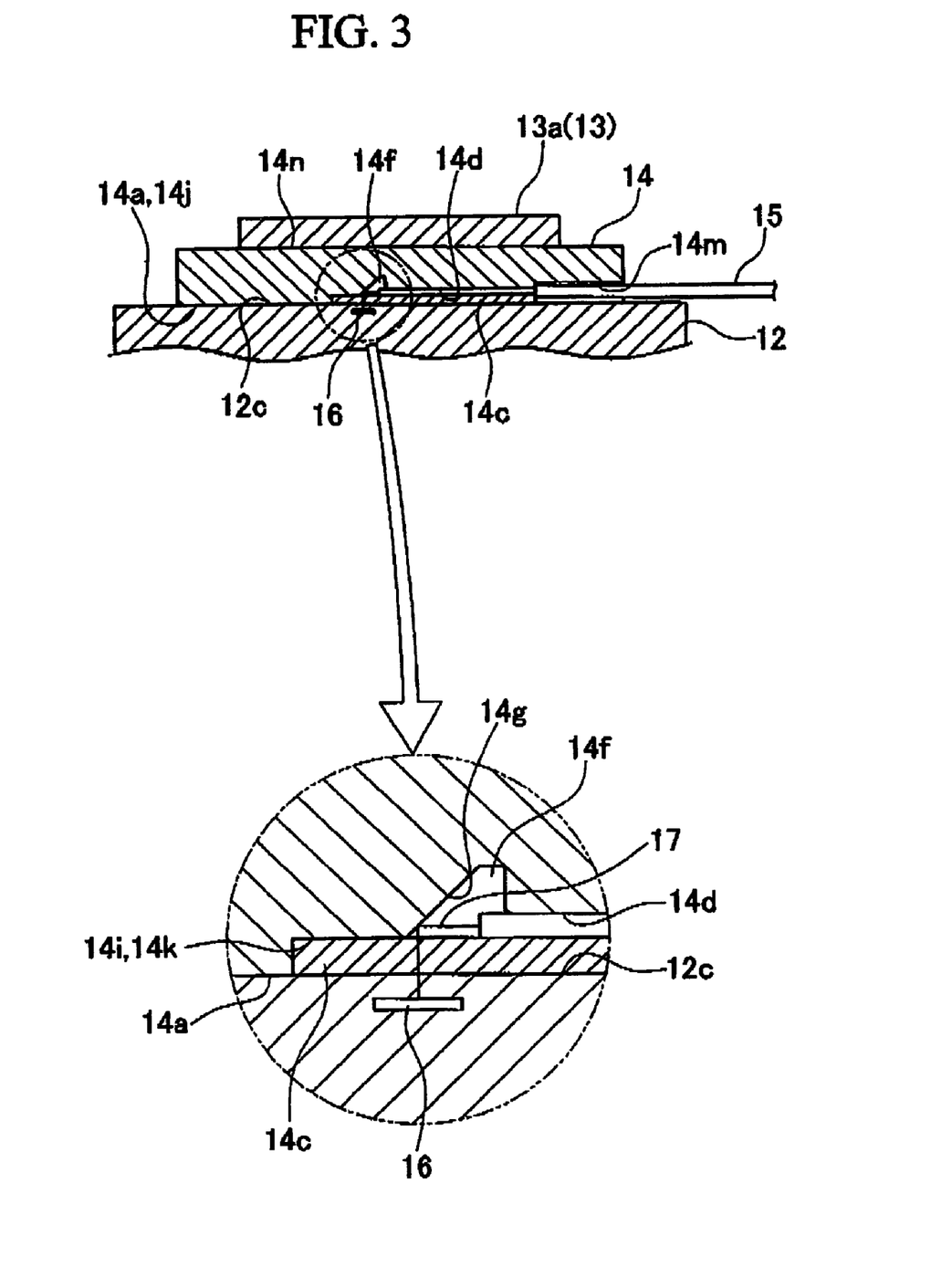
FIG. 3 is an enlarged cross sectional view showing a relationship between an optical axis-containing part of a connector body of the optical connector of FIG. 1 and an optical device of an optical module.

FIG. 1 is an exploded perspective view showing the structure of an optical connector 10 according to the present invention, FIG. 2A is an exploded front view of the optical connector 10, FIG. 2B is a front view showing a state where the optical connector 10 is assembled, and FIG. 3 is an enlarged cross-sectional view showing a relationship between an optical axis converting part 14b of a connector body 14 of the optical connector 10 and an optical device 16 of an optical module 12.

In FIGS. 1 to 3, reference numeral 11 denotes a circuit board, 12 denotes the optical module, 13 denotes a connector fixing member, 14 denotes a connector body and 15 denotes an optical fiber (e.g. coated optical fiber).

A circuit board is cited as an example of the circuit board 11.

The optical connector 10 according to the present invention includes: the circuit board 11; the optical module 12 mounted on the circuit board 11; the connector body 14 attached to the tip of the optical fiber 15; and the connector fixing member 13 for pressing the connector body 14 provided on the circuit board 11 made to face the optical module 12 again the optical module 12.

(Optical Module)

The optical module 12 is a or array-shaped module on (in) which an optical device such as a light-emitting device such as a semiconductor laser (e.g., laser diode (LD)) or a light-receiving device such as a photodiode (PD) is mounted (housed). The optical module 12 has function(s) for driving the light-emitting device (optical device 16) based on control signals from a driving circuit on the circuit board 11 and/or for transmitting electrical signals to a processing circuit on the circuit board 11 in accordance with light-signals of the light-receiving device (optical device 16).

The optical device 16 functions as an optical input/output end according to the present invention.

Moreover, for example, the optical input/output end according to the present invention includes an end of an optical fiber.

The optical module 12 is electrically connected to a circuit pattern etc., on the circuit board 11 with connecting terminals 12b (e.g. solder bump) provided on a bottom spice 12a by the BGA (Ball Grid Army) method Electrical connection of the optical module 12 and the circuit pattern of the circuit board 11 may be performed by wire-bonding or the like. However, the BGA method is superior to wire-bonding in that it is unnecessary to secure a space for electrical connection of the optical module 12 and the circuit pattern on the circuit board 11 other than a mounting space of the optical module 12.

The optical module 12 has a joining surface 12c (upper surface) made to face the connector body 14 on the reverse side of the bottom surface 12a.

The optical device 16 of the optical module 12 is provided at the joining surface 12c side of the optical module 12.

Moreover, the joining surface 12c is extended along a direction parallel with the circuit board 11.

An optical axis of the optical device 16 of the optical module 12 is in the orthogonal direction to the circuit board 11.

The optical device 16 of the optical module 12 shown in FIG. 3 is formed in a recessed part (not shown) slightly recessed from the joining surface 12c, is made to face the connector body 14 joined with the joining surface 12c, and transmits/receives optical signals to/from the connector body 14.

Moreover, the joining surface 12c may be formed with a transparent plate such as a glass plate fitted in the optical module 12. In this case, the optical device 16 is built in the reverse side of the joining surface 12c formed of the transparent plate in the optical module 12. Transmitting/receiving of the optical signals between the optical device 16 and the connector body 14 is performed via the transparent plate. The optical device 16 is protected by the transparent plate.

(Circuit Board)

Although not shown, for example, the circuit board 11, on which the optical module 12 is mounted, is a discrete circuit board, on which an optical and electrical converting circuit, control processor, optical signal processing circuit, optical device driving circuit, memory circuit, various circuits for drive-controlling electronic parts on the circuit board, or the like, is constituted by the electronic parts mounted thereon as appropriate. Additionally, an LSI having these circuit fixations may be mounted on the circuit board as appropriate.

(Connector Body)

Figure 4A:
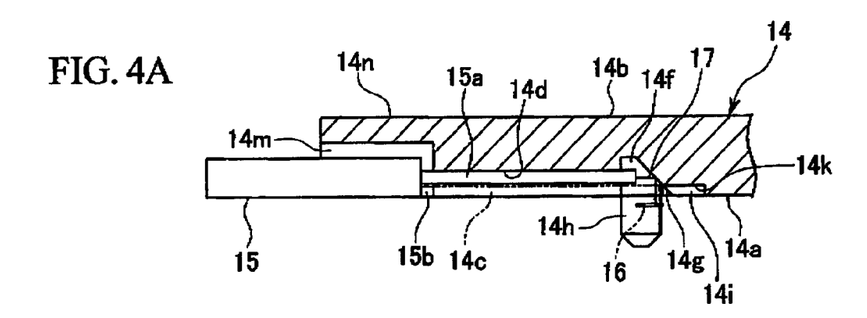
FIG. 4A is a front cross-sectional view schematically showing the structure of the connector body according to the preset invention
Figure 4B:
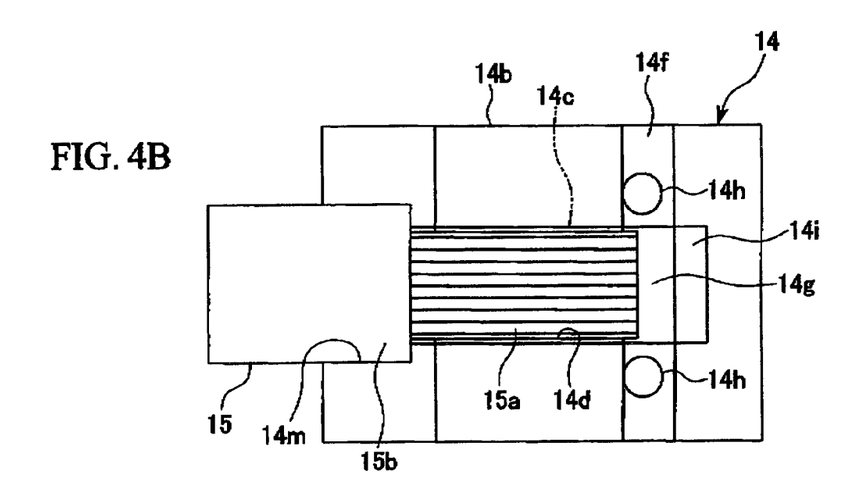
FIG. 4B is a view thing Me lower surface (joining surface) of the connector body viewed from the joint surface side jointed to the joint surface of the optical module.
Figure 4C:
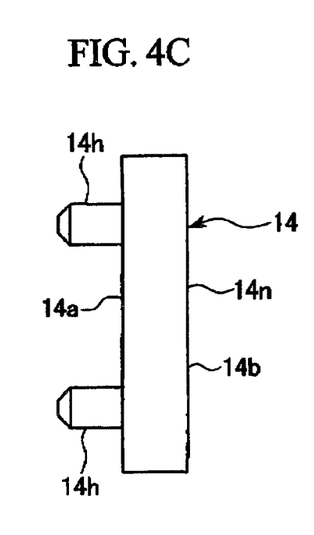
FIG. 4C is a side view of the connector body according to the present invention.
Figure 5:
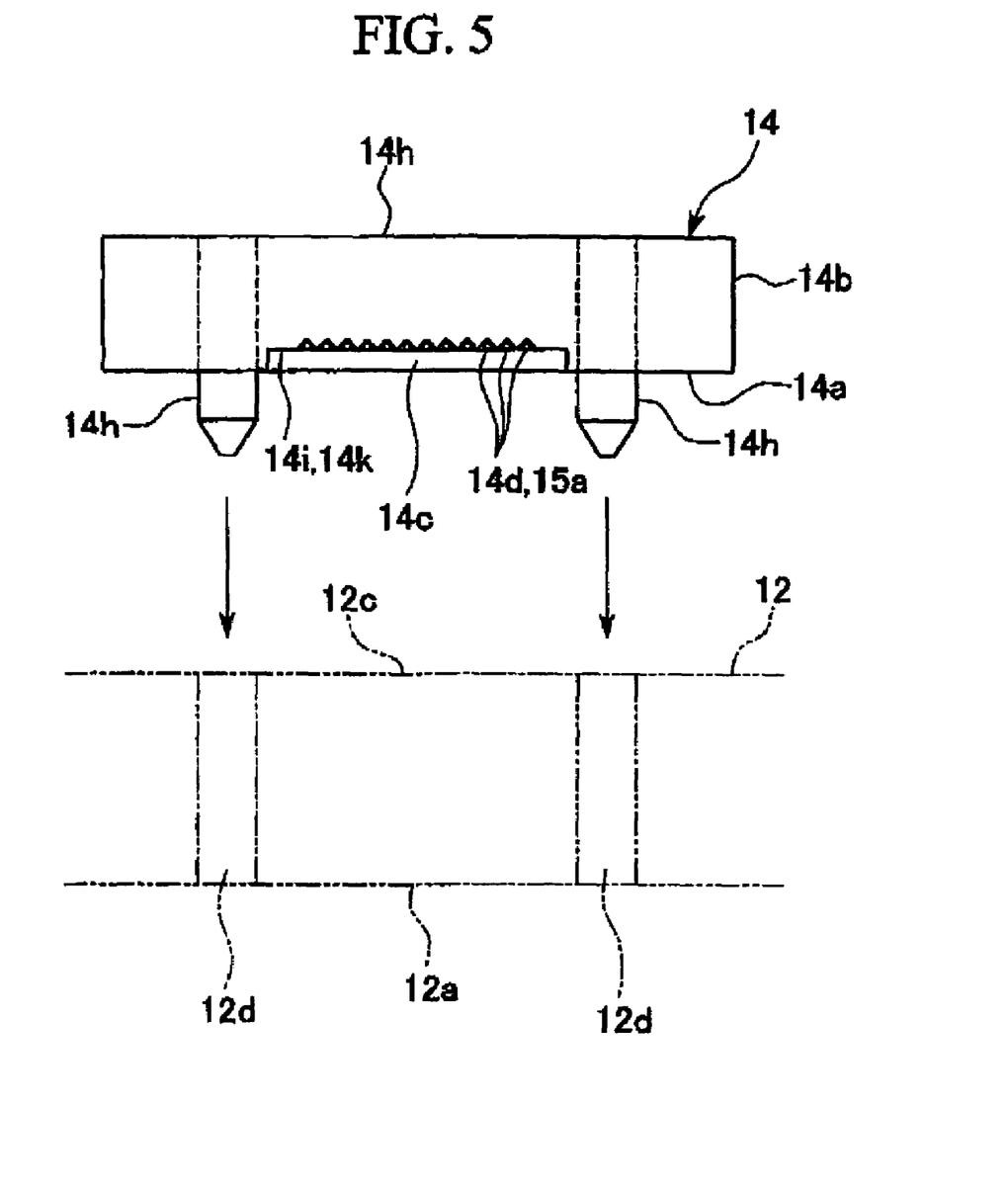
FIG. 5 is a side cross sectional view of the connector body of FIG. 4A.

FIG. 4A is a front cross-sectional view schematically showing the structure of the connector body 14, FIG. 4B is a view showing the lower surface of the connector body 14 viewed from 14a joined to the joining surface 12c of the optical module 12, FIG. 4C is a side view of the conquer body 14, and FIG. 5 is a side cross-sectional view of the connector body 14.

As shown in FIGS. 4A, 4B, 4C and 5, the connector body 14 has a block-shaped body 14b made of synthetic resin such as plastic (e.g. PPS (polyphenylene sulfide), epoxy resin) and a glass plate 14c which is adhered and fixed to the body 14b, and sandwiches optical fibers 15a (bare optical fibers) exposed by removal of a coating on the end of the optical fibers 15 between the body 14b and the glass pate 14c for fixing.

Additionally, a recessed part for optical axis conversion 14f recessed from the joining surface 14a is formed in the body 14b of the connector body 14.

The glass plate 14c is fitted in a shallow grooved recessed part for plate fitting 14i recessed from a bottom surface 14j of the body 14b and fixed to the body 14b with an adhesive.

The glass plate 14c is arranged flush with the bottom surface 14j (joined with the joining surface 12c of the optical module 12) of the body 14b, and constitutes a part of the joining surface 14a of the connector body 14.

However, the glass plate 14c is not always required to be arranged flush with the bottom surface 14j of the body 14b.

The whole glass plate 14c is housed in the recessed part for plate fitting 14i so that the glass plate 14c is positioned at a place lower than the bottom surface 14j of the body 14b, and thus only the bottom surface 14j of the body 14b may function as the joining surface 14a. Alternatively, the joining surface 14a may be formed by only the glass plate 14c adhered throughout the whole bottom surface 14j of the body 14b.

Moreover, a translucent plate made of a material other than a glass plate is applicable to the connector body in place of the glass plate 14c. For example, a translucent plate made of plastic is applicable.

That is, a translucent plate is applicable which is made of a material in which at least optical attenuation and optical loss can hardly arise in a used wavelength band.

In FIG. 4B, a multi optical fiber tape core wire is shown as the optical fiber 15. The plurality of optical fibers 15a (bare optical fibers) exposed by removal of the coating of the tip of the optical fiber 15 (optical fiber core wire) are pressed against the body 14b by the glass plate 14c and fixed to the body 14b and the glass plate 14c with an adhesive, with the optical fibers 15a housed in positioning grooves 14d respectively, which are formed on a bottom surface 14k of the recessed part for plate fitting 14i parallel with each other. The glass plate 14c functions as a lid for Cog the optical fibers 15a, which are arranged in the positioning grooves 14d respectively, against he positioning grooves 14d.

One optical fiber 15a is housed in a positioning groove 14d.

The optical fibers 15a are precisely positioned by the positioning grooves 14d so as to ice a reflecting part 14g (described below) on the inner surface of the recessed part for optical axis conversion 14f.

Additionally, each optical fiber 15a is positioned by the positioning in groove 14d and the glass plate 14c so as to be parallel with the joining surface 14a of the connector body 14.

A coated part 15b of the optical fiber 15 as the optical fiber core wire is housed in a coated housing groove 14m formed in the bottom surface 14j of the body 14b, and is fixed to the body 14b with an adhesive.

The cross section of the positioning groove 14d in the embodiment is a V-shape. However, the cross section of the positioning groove 14d is not limited to the V-shape. For example a round shape (a half circle-shape), a U-shape or the like is applicable. Additionally in place of forming the positioning groove in the lower surface of the body 14b of the connector body 14, a positioning groove may be formed in the upper surface (facing the bottom surface 14j of the recessed part for plate fitting 14i) of the glass plate 14c, or positioning grooves may be respectively formed in both the lower surface of the body 14b of the connector body 14 and the upper surface of the glass plate 14c.

Moreover, a mechanism for positioning the optical fibers 15a is not limited to the positioning with the positioning grooves 14d and the glass plate 14c For example, positioning with positioning holes formed in the body 14b of the connector body 14 is applicable.

Additionally, the optical fiber 15 is not lime to the multi optical fiber tape core wire. For example, a single-fiber coated optical fiber is applicable.

Additionally, a quartz-type optical fiber or the like can be employed as an optical fiber (specifically, a bare optical fiber) applicable to the connector body 14. Further, a GI (graded index)-type optical fiber or the like is applicable to the quartz-type optical fiber, but it is not limited thereto.

The tip of each optical fiber 15a is inserted into the recessed part for optical axis conversion 14f of the connector body 14, and made to face the reflecting part 14g formed in the recessed part for optical axis conversion 14f.

The recessed part for optical axis conversion 14f is formed in a groove shape on the bottom surface 14j of the body 14b, more specifically, it is formed in a groove shape from the bottom surface 14k of the recessed part for glass plate fitting 14i An opening of the recessed part for optical axis conversion 14f is covered wit the glass plate 14c attached to the body 14b.

Hereinafter, in the connector body 14, an extending direction (the lengthwise direction in FIG. 4B, the lengthwise direction in FIG. 4C, and the lateral direction in FIG. 5) of the recessed part fiber optical axis conversion 14f is reference to as the width direction, and a direction along the joining surface 14a and orthogonal to the width direction (the lateral direction in FIGS. 4A and 4B) is referred to as the lengthwise direction. Further, a direction orthogonal to the joining surface 14a is referred to as thickness direction.

In the connector body 14 shown in the figures, the size in the lengthwise direction is larger an the size in the width direction. However, the size in the lengthwise direction is not always rewired to be larger than the size m the width direction. A connector body having the size in the lengthwise direction smaller than the size in the width direction is applicable to the connector body used in the present invention.

The positioning grooves 14d are extended in the lengthwise direction of the connector body 14. Longitudinal directions of the optical fiber 15 and optical fibers 15a are fixed to the connector body 14 being made to be parallel with the lengthwise direction of the connector body 14, and the optical fiber 15 and optical fibers 15a The plurality of optical fibers 15a are positioned horizontally with each other by the positioning grooves 14d, and laterally arranged in the width direction of the connector body 14.

The reflecting part 14g is fined of a metallized film on the inner wall of the recessed part for optical axis conversion 14f positioned on the line extending from the optical axis of the tip of the optical fiber 15a inserted into the recessed part fiber optical axis conversion on 14f, and forms into a reflecting surface tilted by 45 degrees with respect to the joining surface 14a of the connector body 14. The inner wall, on which the reflecting part 14g is provide, aces a wall (a part of the body 14b) at the side, where the posing grooves 14d are formed, via the recessed part for optical axis conversion 14f, and is tilted so as to approach the wall at the side, where the positioning grooves 14d are formed, as though approaching a back section 14n side from the joining surface 14a side of the body 14b.

When the connector body 14 is attached to the optical module 12, the reflecting part 14g is positioned right on the optical device 16 of the optical module 12, is made to face a light emitting surface or light-receiving surface of the optical device 16, and functions as an optical axis-converting part that forms an optical path between which the optical device 16 is optically connected to the optical fibers 15a.

The reflecting part 14g, which forms the reflecting surface tilted by 45 degrees with respect to the join surface 14a of the connector body 14 and is shown in the figures, is tilted by 45 degrees with respect to the optical axis of the optical fiber 15a, and is tilted by 45 degrees with respect to the optical axis of the optical device 16 orthogonal to the joining surface 12c of the optical module 12.

Therefore, the reflecting part 14g bends light emitted from the tips of the optical fibers 15a by 90 degrees and irradiates the bent light onto the optical device 16, and functions as a mirror which bends light emitted from the optical device 16 by 90 degrees and makes the bent light incident into the optical fibers 15a.

A part positioned between the reflecting part 14g and the optical device 16 in an optical path 17 is an optical path between which the connector body 14 is optically connected to the optical device 16, and is tilted (orthogonal to the circuit board 11 in the embodiment) with respect to the circuit board 11 (in the extending direction of the circuit board). Thus, in the optical connector 10, the optical device 16 is optically connected to the optical fiber 15 via the optical axis tilted (orthogonally in the embodiment) with respect to the circuit board 11. The connector body 14 fulfills a function for optically connecting the optical fiber 15, which is laterally extending with respect to the optical axis of the optical path between which the connector body 14 is optically connected to the optical device 16, to the optical device 16.

Moreover, in the embodiment, the reflecting part 14g as the mirror is a reflecting film formed by a metallized film, however, the reflecting film is not limited thereto. A variety of structures may be applicable such as a chip on which a film is formed may be built in the recessed part for optical axis conversion 14f.

An optical axis-converting part according to the present invention is not limited to the reflecting part 14g. For example, a part using a lens, optical fiber or the like can be employed as the optical axis-converting part.

The tilt angle of the reflecting part 14g with respect to the joining surface 14a of the connector body 14 is not limited to 45 degrees. As the reflecting part 14g, a part may be used which forms a bent optical path between the tip of the optical fiber 15 fixed to the connector body 14 and the optical device 16 and makes an optical connection between the optical fiber 15 being laterally extended with respect to the optical axis of the optical path between which the connector body 14 is optically connected to the optical device 16. While fulfilling the function, a tilt angle with respect to the joining surface 14a of the connector body 14 can be properly set.

Additionally, the optical fiber 15a is not always required to be projected from the positioning groove 14d to the recessed part for optical axis conversion 14f, and precision of positioning the tip of the fiber 15a made to face the reflecting part 14g with respect to the reflecting part 14g could be secured. A constitution such at the tip is not projected to the recessed part for optical axis conversion 14f and flush with the inner surface thereof, or a constitution such that the tip is positioned inside of the positioning groove from the inner surface of the recessed part for optical axis conversion in the positioning groove is applicable.

The joining surface 14a side of the recessed part for optical axis conversion 14f is covered with the glass plate 14c, and the optical fibers 15a can be prevented from being contaminated by intrusion of dust after fixing. The recessed part for optical axis conversion 14f may be hollow, however, it may be filled with a transparent (or half-transparent so as not to block the optical path) adhesive so that the optical fibers 15a and the glass plate 14c are fixed.

Additionally, transmission light between the optical fibers 15a and the optical device 16 permeates through the glass plate 14c, and a part positioned between the reflecting part 14g and the optical device 16 in the optical path 17 between the optical fibers 15a and the optical device 16 crosses over the glass plate 14c. The glass plate 14c has an optical property whereby loss by dispersion, etc., can hardly be caused for light passing through the optical path 17.

A pair of positioning pins 14h project from the joining surface 14a is inserted into and engaged with a pair of pin holes 12d formed in the optical module 12 and opened to the joining surface 12c respectively so that precision of positioning the connector body 14 to the optical module 12 can be secured.

The positioning pins 14h are arranged on both sides of the reflecting part 14g, and both sides of the connector body 14 in the width direction via the recessed part for optical axis conversion 14f. However, the projection position of the pair of positioning pins 14h is not limited to this position, and can be suitably changed.

The positioning pins 14h projecting from the connector body 14 and the optical module 12 having the pin holes 2d, into and with which the positioning pins 14h are inserted and engaged, function as positioning means of the pin engagement method for positioning the connector body 14 at a position where the connector body 14 can be optically connected to the optical device 16. The optical module 12 having the pin holes 12d functions as both an optical input/output end (optical device 16) and a positioning member.

Moreover, in the embodiment, the method has been cited in which the engaging pins (positioning pins) projecting from the connector body are inserted into and engaged with the pin holes of the optical module. However, the pin holes are not always required to be formed in the optical module, that is, the positioning member in which the pin holes are formed is not limited to the optical module. For example, the pin holes may be formed in a member fixed to the circuit board (engaging member of the present invention) other than the optical module. Alternatively, a method is applicable in which engaging pins projecting from the me fixed to the circuit board (positioning member e.g. optical module, engaging member) or the circuit board itself are inserted into and engaged wit pin holes foamed in the optical connector.

(Connector Fixing Member)

As shown in FIGS. 1, 2A and 2B, the connector fixing member 13 shown in the figures is a gate-shaped (U-shaped) frame body having a long plate-shaped beam part 13a for being pressed against the back surface 14n on the reverse side (opposite side in a thickness direction) of the joining surface 14a of the connector body 14 and a pair of elastic engaging pieces 13b (engaging parts), which are projected from both sides of the beam part 13a in the longitudinal direction respectively and capable of being engaged/disengaged with/from to circuit board 11.

In the connector fixing member 13, the beam part 13a functions as a fixing member body.

The connector fixing member 13 is a component made of synthetic resin. However, for example, the connector fixing member 13 may be formed by one sheet of a metal plate having elasticity such as a stainless steel plate.

The pair of elastic engaging pieces 13b of the connector fixing member 13 is pressed and inserted into engaging holes 11a, which are made to penetrate through the circuit board 11, on both sides of the optical module 12 respectively so as to be engaged with the circuit board 11.

Small projection-shaped engaging claws 13c projecting from the top ends of the elastic engaging pieces 13b of the beam part 13a respectively are engaged with the circuit board 11 from a back surface 11c side on the reverse side of a surface 11b, on which the optical module 12 of the circuit board 11 is mounted, (more specifically, engaged with a part facing the engaging hole 11a in the circuit board. The part functions as an engaging part with/from which the elastic engaging pieces can be engaged or disengaged). Thus, the engagement of the elastic engaging pieces 13b and the circuit board 11 can be realized.

In each elastic engaging piece 13b, the engaging claw 13c is projected to the side facing a space 13d between the pair of elastic engaging claws 13b.

As shown in FIG. 2, a distance L1 between the pair of engaging holes 11a formed in the circuit board 11 on both sides of the optical module 12 is slightly larger than a distance L2 between the pair of elastic engaging pieces 13b of the connector fixing member 13. Thus, when the pair of elastic engaging pieces 13b of the connector fixing member 13 is inserted into the engaging holes 11a from the surface 11b side of the circuit board 11 respectively, that is, the engaging claws 13c on the tips of the elastic engaging pieces 13b are inserted into the engaging holes 11a respectively, the pair of elastic engaging pieces 13b is elastically deformed so that the distance between the pair of elastic engaging pieces 13 is slightly increased (the distance L2 is increased). When the engaging claws 13c pass through the engaging holes 11a respectively, the distance L2 between the pair of elastic engaging pieces 13b is reduced by elastic force of the connector fixing member 13, the engaging claws 13c ether the back surface 11c side of apart between the pair of engaging holes 11a in the circuit board 11, and the elastic engaging pieces 13b are engaged with the circuit board 11.

The elastic engaging pieces 13b can hardly be pulled out of the circuit board 11 when engaged with the circuit board 11, and a state where the connector fixing member 13 is assembled in the circuit board 11 is brought about.

The engaging claw 13c of the elastic engaging piece 13b shown in the figures is a mount-shaped small projection having a first tilted surface 13e extending from a top part projected from the elastic engaging piece 13b to the tip side of the elastic engaging piece 13b and a second tilted sure 13f extending from the top part to the beam part 13a side.

Thus, when the connector fixing member 13 attached to the circuit board 11 by the engagement of the pair of elastic engaging pieces 13b and the circuit board 11 is strongly pulled so as to be drawn out of the circuit board 11, the tips of the of elastic end pieces 13b can be drawn out to the surface 11b side of the circuit board 11 via the engaging holes 11a. Thus, the connector fixing member 13 can be detached from the circuit board 11.

Additionally, in order to detach the connector fixing member 13 attached to the circuit board 11 from the circuit board 11, the distance L2 between the pair of elastic engaging pieces 13b is slightly increased, the engagement of the engaging claws 13c on the tip of each elastic engaging piece 13b and the circuit board 11 is released, and the tip of each elastic engaging piece 13b is drawn out from the engaging hole 11a of the circuit board 11 to the surface 11b side thereof.

The constitution, in which the connector fixing ember 13 attached to the circuit board 11 by the engagement of the pair of elastic engaging pieces 13b and the circuit board 11 is strongly pulled so as to be drawn out of the circuit board 11, and the connector fixing member 13 is detached from the circuit board 11, can be realized by not only the employment of the engaging claws 13c having the first and second tilted surfaces but also by forming tilted surfaces on the engaging parts with which the engaging claws 13c of the elastic engaging pieces 13b are engaged respectively, or the like. The same is applicable to an engaging member 18 described below.

It is preferable that a knob 13h (see FIG. 9A) for detachment operation from the circuit board 11 (or engaging member 18 described below) be provided in the connector fixing member 13.

Figures 9A, 9B, 9C:
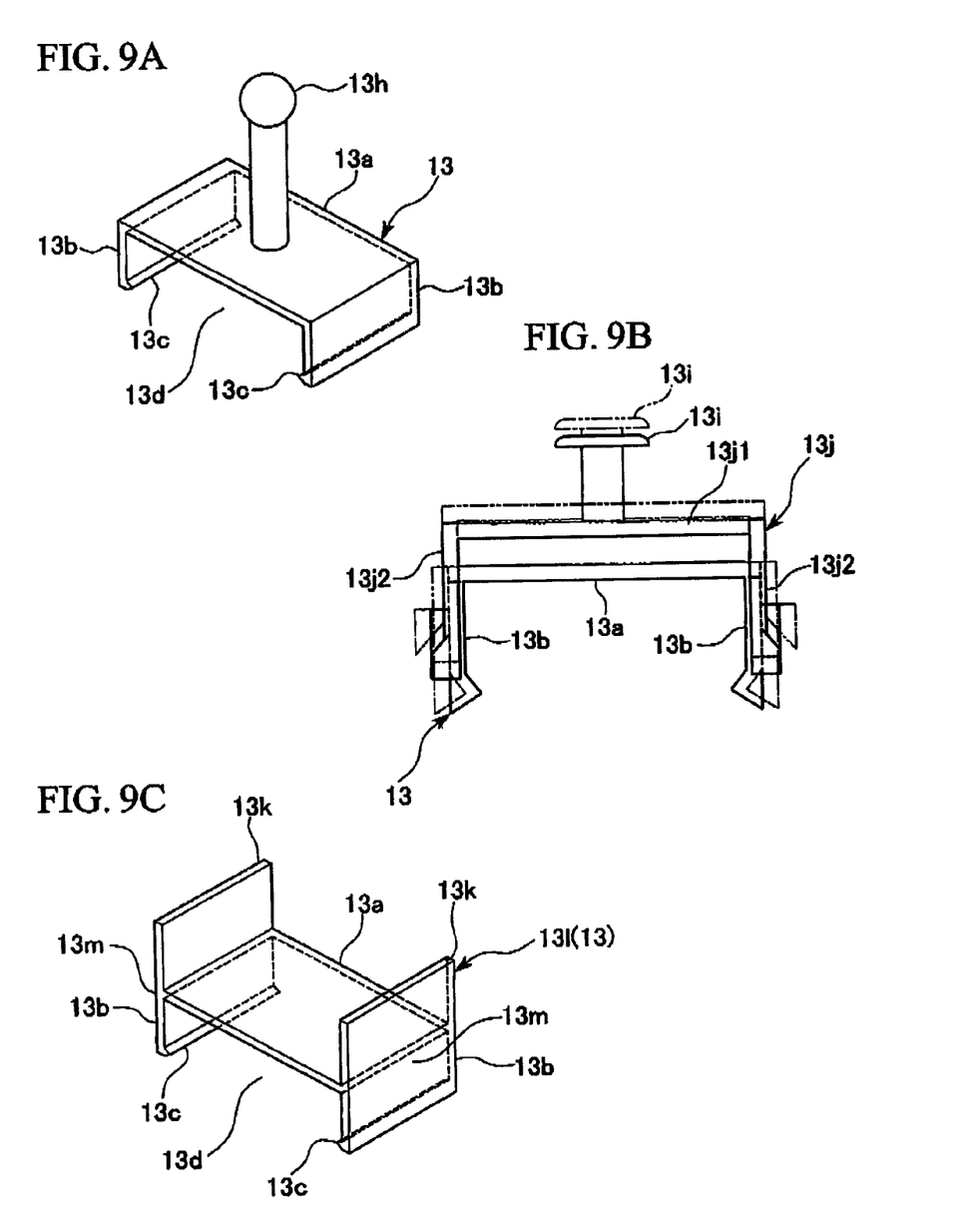
FIG. 9A is a perspective view showing an example of the connector fixing member including a knob for a pulling operation.
FIG. 9B is a front view showing an example of the connector fixing member to which an attachment for releasing engagement is attached.
FIG. 9C is a perspective view of Me connector fixing member with a knob for operation for releasing engagement of elastic engaging parts and a board.

Additionally, it is referable that the connector fixing member 13 include an engagement releasing mechanism (attachment for releasing engagement 13j) which elastically deforms the pair of elastic engaging pieces 13b to release the engagement with the circuit board 11 (or the engaging member 18 descried below) by a pulling operation of a knob 13i as shown in FIG. 9B.

In the attachment for releasing engagement 13j shown in the figure, the knob 13i is projected on a gate-shaped attachment body 13j1 attached to the outside of the connector fixing member 13. When the knob 13i is pulled, a pair of engagement releasing pieces 13j2 on both sides of the gate-shaped at attachment body 13j1 elastically deform the pair of elastic engaging pieces 13b of the connector fixing member 13 to enlarge the distance between the pieces 13b, and thus the engagement with the circuit board 11 (or the engaging member 18 described below) can be released. Moreover, a stopper (not shown) is formed on the attachment for releasing engagement 13j, the stopper preventing the attachment for releasing engagement 13j from being pulled out of the connector fixing member 13 by engagement with the connector fixing member 13 when the knob 13i is pulled.

However, the strange of an attachment for releasing engagement is not limited to the structure shown in FIG. 9B. Various structures are applicable.

Further, in FIG. 9C, a pair of projected wall-shaped knobs 13k being projected as if the pair of elastic engaging pieces 13b are from the beam part 13a to a reverse side thereof is projected on the beam part 13a.

Each knob 13k is formed like a sheet of a plate member continuous with the elastic engaging piece 13b. Operation of the knob 13k allows the elastic engaging piece 13b to be rotationally displaced around a connecting part 13m between the elastic engaging piece 13b and the beam part 13a, and thus the engagement of the elastic engaging pieces 13b and the circuit board 11 (or the engaging member 18 described below) can be released. For example, in a connector fixing member 13l (connector fixing member with knobs) shown in FIG. 9C, when the pair of knobs 13k is made to approach each other, the distance between the pair of engaging claws 13c of the tips of the elastic engaging pieces 13b is enlarged, and the engagement of the engaging claws 13c of the connector fixing member 13l and the circuit board 11 can be released. Thus, the connector fixing member 13l can be pulled out of and detached from the circuit board 11 (or the engaging member 18 described below).

In the case where the connector fixing member 13l with knobs 13k or the above-described attachment for releasing engagement is employed, it is preferable that the engagement of the connector fixing member and the circuit board 11 (or engaging member 18 described below) cannot be released unless the knobs are pulled owing to adjustment of the shape of the engaging claw 13c of the elastic engaging piece 13b, or the like.

Moreover, both the knobs 13h and 13k function as not only a knob for being pulled to the extent that the connector fixing member is detached from the circuit board 11 (or engaging member 18 described below) but also a knob for being pressed so that the connector fixing member is pressed into and engaged with the circuit board 11 (or engaging member 18 described below).

Additionally, the knob 13i of the attachment for releasing engagement also functions as not only a knob for being pulled to the extent that the connector fixing member is detached from the circuit board 11 (or the engaging member 18 described below) but also a knob for being pressed so that the connector fixing member is pressed into and engaged with the circuit board 11 (or the engaging member 18 described below).

Moreover, in the connector fixing member, the engaging claw 13c of the tip of each elastic engaging piece 13b may be projected on the reverse side of the side facing the space 13d between the pair of elastic engaging pieces 13b. In this case, similarly, the pair of elastic engaging pieces 13b is pressed into the engaging holes 11a formed on both sides of tie optical module 12 in the circuit board 11 and engaged with the circuit board 11 so that the connector fixing member is attached to the circuit board 11. However, when the connector fixing member in the attachment state is detached from the circuit board 11, the engagement of the pair of elastic pieces 13b and the circuit board 11a is released by strongly pulling the connector fixing member or reducing the distance L2 between the pair of elastic engaging pieces 13b.

In the optical connector 10 shown in the figures, as shown in FIGS. 1, 2A and 2B, the pair of engaging holes 11a formed in the circuit board 11 on both sides of the optical module 12 is positioned on the line extending from an arrangement line (virtual line H) connecting the pair of pin holes 12d drilled in the optical module 12 to each other.

The pair of positioning pins 14h projected in the width direction at the predetermined interval is inserted into and engaged with the pair of pin holes 12d of the optical module 12 respectively, so that the connector body 14 is mounted on the optical module 12 so as to be overlaid.

The connector fixing member 13 is structured so that, the pair of elastic engaging pieces 13b is pressed into the engaging holes 11a, positioned on both sides of the optical module 12 of the circuit board 11 from both sides of the connector body 14 mounted on the optical module 12, respectively, and is engaged with the circuit board 11, so that the beam part 13a is brought into contact with the back surface 14n of the connector body 14. Thus, the connector body 14 is pressed again the optical module 12 by pressing force from the beam part 13a, and the joining surface 14a of the connector body 14 is reliably joined with the joining sure 12c of the optical module 12. The beam part 13a of the connector fixing member 13 functions as a pressing part for being pressed against the back surface 14n of the connector body 14.

In the optical connector 10 shown in the figures, the beam part 13a of the connector fixing member 13 is arranged on the back surface 14n in a direction along the width direction of the connector body 14.

However, a direction of the beam part 13a of the connector fixing member 13 with respect to the connector body 14 is determined by a position of the engaging holes 11a of the circuit board 11, etc. For example, the beam part 13a may be arranged on the back surface 14n in a direction along the lengthwise direction of the connector body 14.

Moreover, the dimensions of the connector body 14 in the width direction and lengthwise direction are approximately the same as those of the optical module 12. The whole connector body 14 mounted on the optical module 12 in the width direction is positioned on the optical module 12, and neither ends of the side project from the optical module 12. Therefore, no trouble is caused in detaching the connector fixing member 13 from the circuit board 11.

(Optical Connection of Optical Fiber and Optical Device, and Release of the Connection)

As described above, the pair of elastic engaging pieces 13b of the connector fixing member 13 is pressed into the engaging holes 11a of the circuit board 11 and engaged with the circuit board 11, and the connector body 14 mounted on the optical module 12 is pressed against the optical module 12 by the beam part 13a of the connector fixing member 13 (a sate shown in FIG. 2B), and thus the joining surface 14a of the connector body 14 is reliably joined with the joining surface 12c of the optical module 12, a required optical property such as optical loss is secured, and the optical fiber 15 can be optically connected to the optical device 16 of the optical module 12.

Then, the positioning pins 14h projected on the joining surface 14a of the connector body 14 are inserted into and engaged with the pin holes 12d of the optical module 12 respectively so that the reflecting part 14g of the recessed part for optical axis conversion 14f of the connector body 14 is precisely positioned at the position facing the optical device 16 of the optical module 12. The optical path 17 is formed between the optical fibers 15a and the optical device 16 so that the optical connection between the optical fibers 15a and the optical deice 16 can be realized.

As shown in FIG. 2B, the engagement of the elastic engaging pieces 13b of the connector fixing member 13 and the circuit board 11 is released from the state where the connector body 14 mounted on the optical module 12 is pressed against the optical module 12 by the connector fixing member 13, and the connector fixing member 13 is detached from the circuit board 11 (see FIG. 2A), thereby making it possible to remove the connector body 14 from the optical module 12. Thus, the optical connection between the optical fibers 15a and the optical device 16 can be released.

Embodiment using Engaging Member

Figure 6:
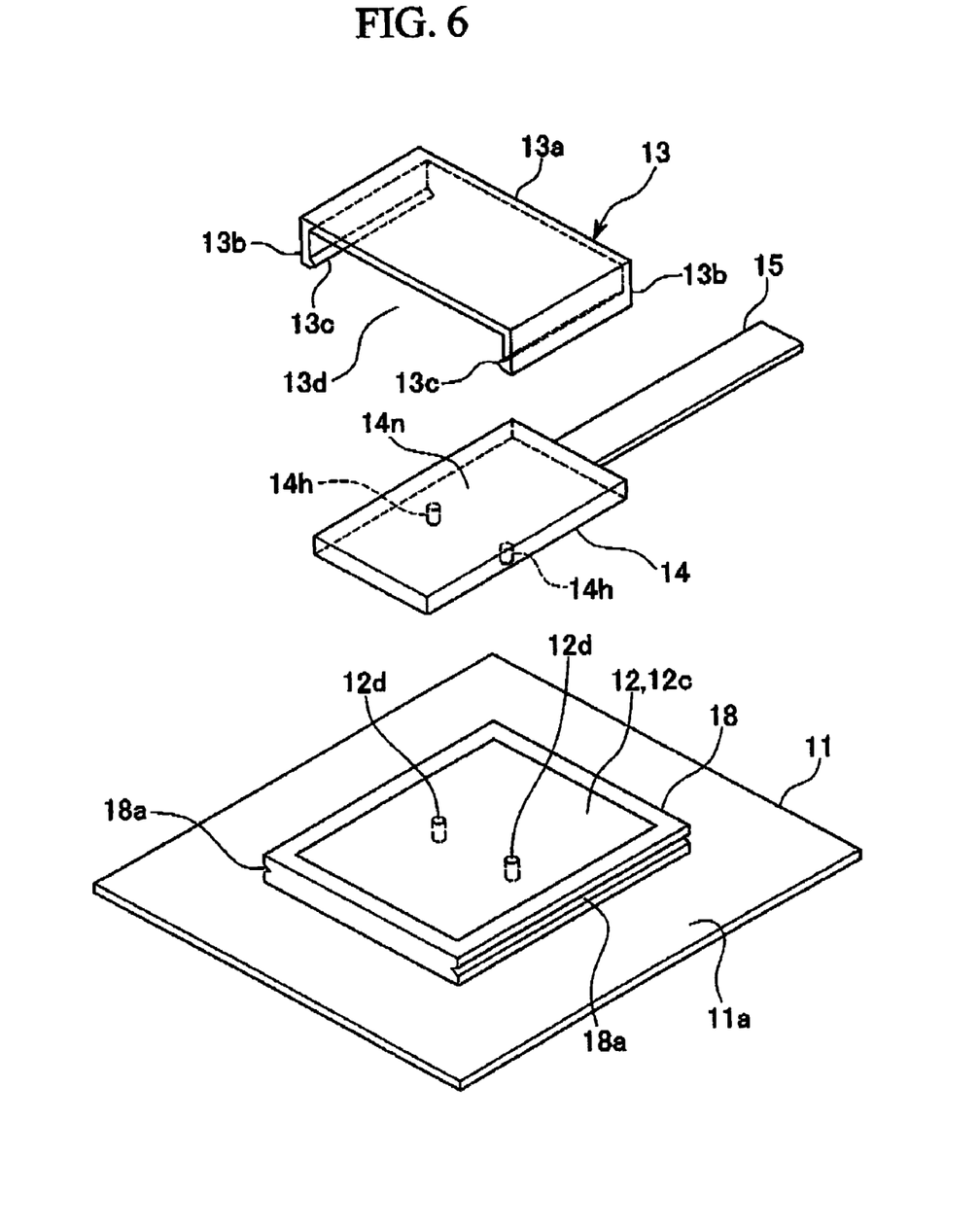
FIG. 6 is an exploded perspective view showing another embodiment of the optical connector according to the preset invention.
Figure 7A:
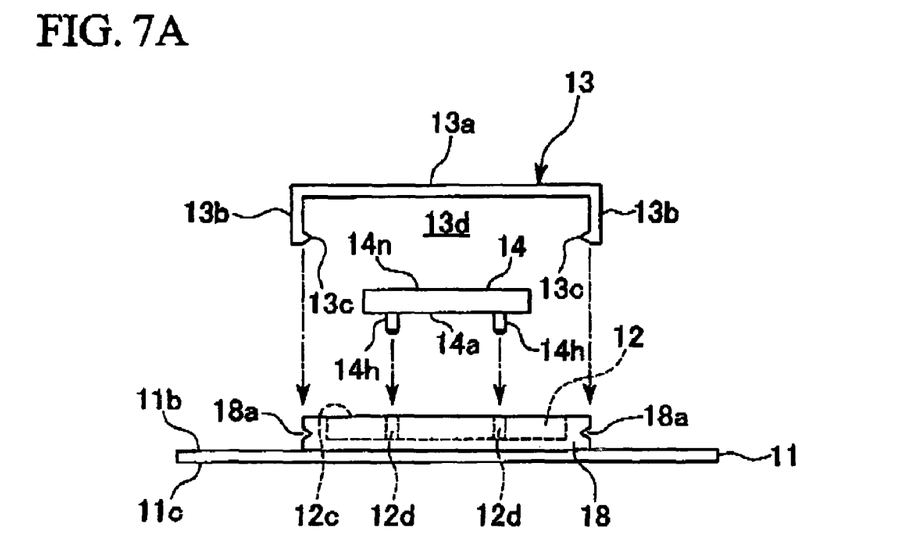
FIG. 7A is an exploded front view of the optical connect of FIG. 6.
Figure 7B:
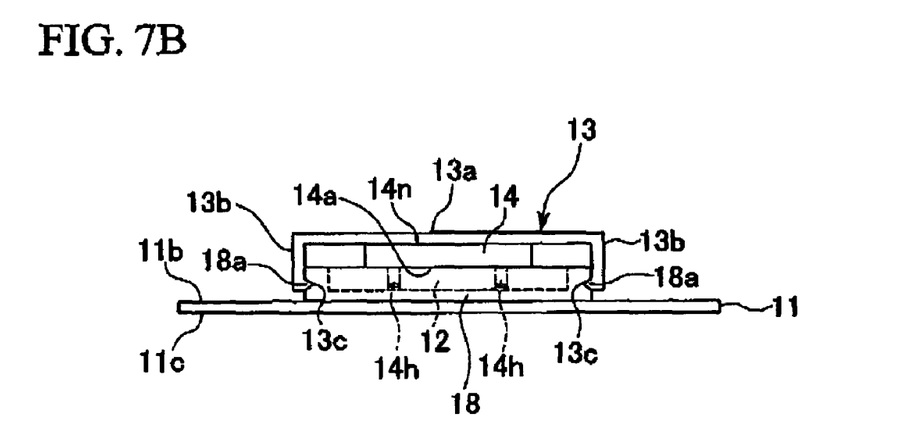
FIG. 7B is a front view sowing a state where the optical connector of FIG. 6 is assembled.

FIGS. 6, 7A and 7B show an embodiment of an optical connector employing the engaging member 18 fixed on the circuit board 11 in place of the engaging holes 11a as an engaging part with/from which the engaging pas (elastic engaging pieces 13b) of the connector fixing member 13 can be engaged/disengaged.

In the embodiment it is unnecessary to form the engaging holes 11a in the circuit board 11.

Moreover, the constitution of the optical connector according to the embodiment is the same as that of the optical connector 10 described with reference to FIGS. 1 to 5 except for using the engaging member 18 without forming the engaging holes 11a.

The engaging member 18 shown in the figures is in a quadrilateral frame shape, and is provided along the outer periphery of the optical module 12 so as to surround it Engaging recessed parts 18a, with which the elastic engaging pieces 13b (more specifically, engaging claws 13c) of the connector fixing member 13 are engaged, are formed on the pair of sides of the engaging member 18 respectively.

The positioning pins 14h are inserted into and engaged with the pin holes 12d of the optical module 12 respectively so that the connector body 14 is mounted on the optical module 12. The pair of elastic engaging pieces 13b of the connector fixing member 13 is pressed against the engaging member 18 from both sides (both sides of the connector body 14 in the width direction) of the connector body 14 on the optical module 12 and engaged with the engaging recessed parts 18a on both sides of the engaging member 18 (the state shown in FIG. 7B). Then, the beam part 13a is pressed against the back surface 14n of the connector body 14, and the connector body 14 is pressed against the optical module 12 by the pressing force from the beam part 13a. Thus, the optical connection bet the optical fibers 15a and the optical device 16 can be realized.

As shown in FIG. 7B, when the connector fixing member 13 attached to the engaging member 18 is strongly pulled, or the engagement of the pair of elastic engaging member 13b is released by enlarging the distance L2 between the pair of elastic engagement pieces 13b, this makes it possible to detach the connector fixing member 13 from the engaging member 18.

The connector fixing member 13 is detached from the engaging member 18, thereby making it possible to remove the connect body 14 from the optical module 12.

The engaging member 18 fixed on the circuit board 11 is allowed to have a socket function or enabling the optical module 12 to repeatedly attach/detach to/from the circuit board 11. The optical module 12 can be held attachably/detachably to/from the circuit board 11 by the engaging member 18.

That is, the engaging member 18 is allowed to have a function for electrically connecting the connecting terminals 12b on the bottom surface of the optical module to the corresponding terminals on the circuit board 11 to the surface, with which the bottom surface 12a of the optical module 12 comes into contact. The electrical connection can be realized at the time of fixing the connector body 14 to the optical module 12 with the connector fixing member 13.

The optical module 12 is pressed and fitted into the quadrilateral frame-shape engaging member 18 from above the circuit board 11, and can be held by the engaging member 18. Then, a state is unstained where the connecting terminals 12b on the bottom surface of the optical module 12 held by the engaging member 18 are positioned to and pressed against the corresponding terminals on the circuit board 11 by the engaging member 18.

When the connector fixing member 13 is pulled out, the connector body 14 can be removed, and the optical module 12 can be removed from the engaging member 18. Thus, the optical module 12 can be easily attached/detached to/from the circuit board 11, exchange and repair of the optical module can be easily performed, and repair cost for a defective board can be reduced.

Moreover, each projection size of the pair of engaging pieces 13b of the connector fixing member 13 shown in FIGS. 6, 7A and 7B from the bean part 13a is adjusted so as to be shorter than that of the connector fixing member 13 shown in FIGS. 1, 2A and 2B. As a matter of course, each size of the connector fixing member including the projection size of the elastic piece 13b from the beam part 13a is required to be properly adjusted in accordance with the size of the connector body 14, the size of the engaging part, with/from which the elastic engaging pie 13b can be engaged/disengaged, at the circuit board side, or the like.

The shape of the engaging member 18 is not limited to the quadrilateral frame shape.

The member 18 makes and engages the connector fixing member 13 stably in a required posture by engaging with the engaging pars (elastic engaging pieces 13b) of the connector fixing member 13, therefore, it may be provided in accordance with the number or position of the engaging parts (elastic engaging pieces 13b) of the connector fixing member 13.

For example, a plurality of engaging members may be projected on the circuit board 11 so as to be position on both sides of the optical module 12 in accordance with the pair of engaging pieces 13b of the connector fixing member 13.

(Another Example of the Connector Fixing Member)

Figure 8A:
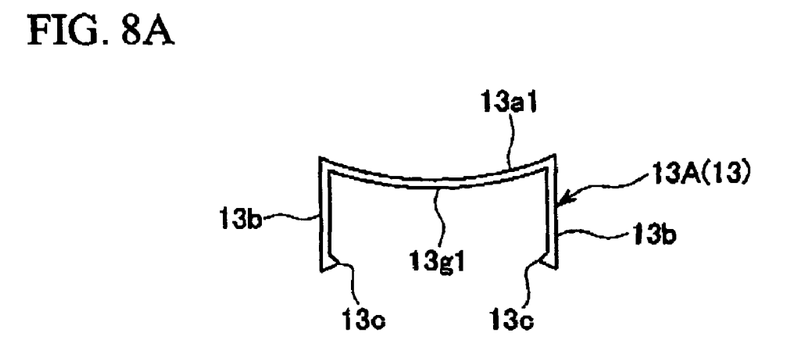
FIG. 8A is a front view showing an example of the connector fixing member.
Figure 8B:
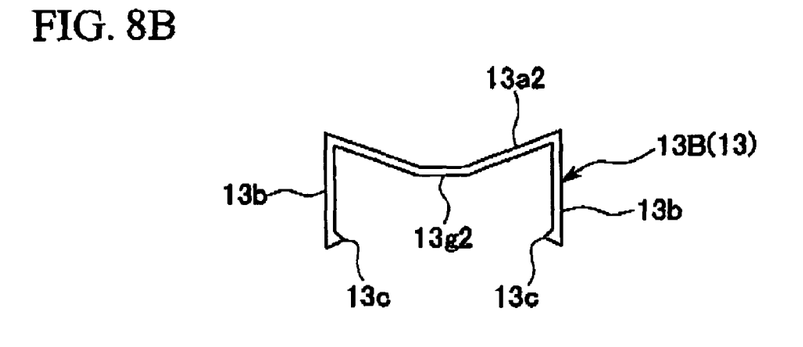
FIG. 8B is a front view showing another example of the connector fixing member.

Another example of the connector fixing member 13 is shown in FIGS. 8A and 8B.

The connector fixing member 13 (herein reference symbol 13A is attached thereto to distinguish it) shown in FIG. 8A has a beam part 13a1 formed in a curved plate shape.

The connector fixing member 13 (hereinafter reference symbol 13B is attached thereto to distinguish it) shown in FIG. 8B has a beam part 13a2 formed in a bent plate shape.

Each structure of the connector fixing members 13A and 13B respectively shown in FIGS. 8A and 8B is the same as that of connector fixing member 13 described with reference to FIGS. 1, 2 and 2B except for being provided with the beam parts 13a1 and 13a2.

The beam parts 13a1 and 13a2 of the connector fixing members 13A and 13B have abutting parts 13g1, 13g2 for being pressed against the connector body 14 by curving and bending at the center parts in longitudinal directions thereof (the middle part between the pair of elastic engaging pieces 13b), respectively.

That is, each center parts of the beam parts 13a1 and 13a2 in the longitudinal direction is projected to the space 13d between the pair of elastic engaging pieces 13b compared with both ends in the longitudinal direction by the curving (for 13a1) or bending (for 13a2). Each of the abutting parts 13g1, 13g2 of the center parts in the longitudinal direction is projected to the front of a direction of being pressed to the circuit board 11 with respect to both ends in the longitudinal direction, in a projecting direction of the elastic engaging pieces 13b from both ends of the beam part. When each of the connector fixing members 13A and 13B is engaged with the circuit board 11 or the engaging member 18, only the abutting FIGS. 13g1, 13g2 are respectively pressed against the connector body 14.

In the connector fixing members 13A and 13B, the beam parts 13a1 and 13a2 function as an elastic spring body. When each of the connector fixing members 13A and 13B is engaged with the circuit board 11 or the engaging member 18 and each of the abutting parts 13g1, 13g2 is pressed against the connector body 14, a pressing force is generated for pressing the connector body 14 against the optical module 12. Therefore, pressing the joining surface 14a of the connector body 14 against the joining surface 12c of the optical module 12 and maintaining the pressing state can be reliably realized.

In the optical connector 10 according to the present invention, the connector body 14 moves in a direction orthogonal to the circuit board 11 so as to be attached/detached to/from the optical module 12, and the connector fixing member 13 for fixing the connector body 14 to the optical module 12 moves in the direction orthogonal to the circuit board 11 so as to be engaged/disengaged with/from the circuit board 11 or the engaging member 18. Thus, compared with the conventional technology for realizing connection of the connector body on the optical axis in the direction along the circuit board 11, a space can be reduced which should be secured on the circuit board 11 for mounting the optical connector. That is, the space on the circuit board for mounting of the connector body is the same as or slightly larger than the space required for mounting the optical module 12 on the circuit board 11, and thus the connection of the optical module 12 (more specifically, the optical device 16) and the optical fiber 15 on the circuit board 11 can be realized with significant space saving.

Thus, packaging density can be improved when a plurality of connector body are mounted on the circuit board 11 via the optical module. Additionally, the degree of freedom in mounting position of the connector body to the circuit board 11, and circuit pattern design can be secured.

Moreover, the present invention is not limited to the above described embodiments, and various modifications are applicable thereto.

The structure of the connector fixing member is not limited to those shown in the above-described embodiments embodiments, and various structures are applicable thereto.

For example the connector fixing member may be in a quadrilateral frame shape. In this case, for example, engaging parts which can be engaged/disengaged with/from engaging members projecting from the board may be provided on the outer periphery of the frame-shaped connector fixing member.

Additionally, the connector fixing member is provided with a fixing member body having a frame part such as the quadrilateral frame and a beam part laid inside of the frame part, and elastic engaging pieces may be projected on the fixing member body. Further, a constitution in which projected piece-shaped elastic pieces, which function as a pressing part, are projected on the fixing member body, a constitution having the beam part or a constitution having no beam part, or the like, are applicable to the connector fixing member.

Although the beam part functions as the pressing part in the above-described embodiments, for example, an elastic spring body may be attached to the beam part. As the elastic spring body, a plate spring-shaped projected piece, coil spring, sponge-shaped resin foam or the like is applicable.

In the above-described embodiments, the connector body 14 is optically connected to the optical device 16 via the optical axis in a direction substantially orthogonal to the circuit board 11, and the optical fiber 15 is optically connected to the optical device 16 via the connector body 14. However, in the present invention, the optical axis in the optical connection between the optical device 16 and the connector body 14 can be tilted with respect to the board, and is not always required to be orthogonal to the circuit board 11.

In the above described embodiments, the connector body arranged so as to be overlaid on the optical device 16 mounted on the circuit board is held by the connector fixing member. However, the present invention is not limited thereto, for example, a constitution can be employed in which the optical fiber of the connector body fixed to the side of the board by the connector fixing member is optically connected to the optical device mounted on another side of the board via a permeating hole of the board.

The connector body used in the present invention can be referred to as a surface-mounting type optical connector.

The optical connector according to the present invention, including a surface-mounting type optical connector, is a general term for connectors including a connector fixing member for pressing and fixing the surface mounting type connector provided on the board while being made to face the optical input/output end, against the board by detachably engaging the optical connector with the board or engaging members projected on the board.

Therefore, a constitution, in which the surface mounting type optical connector faces the end surface of a light-receiving or light-emitting device (light-receiving surface or light-emitting surface) even if only the light-receiving or light-emitting device is provided on the board and no circuit is provided thereon, and in which the facing state of the mounting type optical connector body can be fixed by the connector fixing member for being engaged/disengaged with/from the board or engaging member, corresponds to the constitution of the optical connector according to the present invention. Additionally, the optical connector according to the present invention includes optical connectors having a member (fixing member engaging parts) with/from which the connector fixing member is engaged/disengaged even if no board is provided (in this case, the fixing member engaging parts function as a board).

In the present invention, the "board" indicates objects (base, stand) on which the optical device is mounted, and is not limited to the circuit board. Additionally, the optical device is not always required to be arranged on the board. For example, the optical device may be arranged in a hole formed in the board.

The positioning pin is a general term for projecting members for positioning the optical connector and the board. It is preferable that a round bar pin made of metal (referred to as the positioning pin in the embodiment) be employed as the positioning pin. However, the positioning pin is not limited to the round bar pin. For example, a projection integrally formed on a connector body made of resin, or a projection integrally formed on a board made of resin may be employed. Any object is applicable to the positioning pin according to the present invention, as long as it projects from the connector body or circuit board (or positioning member fixed to the board) side to the other and can perform positioning of the optical connector and the circuit board. For example, as long as a projecting part projected on connector body is fitted with the other side (board side) and can function to position the board and the connector body, the projecting part can be referred to as the "positioning pin" according to the present invention. Further, if a projecting part projected on the board side is fitted with a recessed part (fitting part) of the connector body and can function to position the board and the connector body, the projecting part can also be called the "positioning pin" according to the present invention. It is preferable that the positioning pin be a round bar pin of which the cross section shape is a circle. However, the cross section may be an elliptic, rectangular, square or the like. Alternatively, the cross section may be a hollow shape. Additionally, it is preferable that the number of positioning pins be two, however, a number except two (one, or three or more) is applicable if an improvement in the position accuracy is required.

On the other hand, the "pin hole (pin hole for positioning)" described herein is a general term of parts into which the positioning pin is fitted, and the pin hole is not limited to a round hole corresponding with the round bar pin. If the pin hole is fitted onto the positioning pin to position the positioning pin with high precision and can function to position the board and the connector body, the pin hole corresponds to "pin hole" according to the present invention.

According to the optical connector of the present invention, the connector body can be easily fixed only by pressing the connector fixing member against the optical input/output end so as to cover the back surface side of the connector body arranged on the board with the joining surface facing the optical input/output end, engaging the engaging part of the connector fixing member with the locking part (locking part provided on the board or the locking member fixed to the board) provided on the board side, and locking the connector fixing member to the board.

Additionally, since the positional accuracy of the connector body with respect to the optical device in the optical module can be secured by the pair of positioning pins projecting from the joining surface with the optical module of the connector body and the pin holes opened to the joint surface with the connector body of the optical module, therefore, employment of a simple structure requiring no accuracy of the engaging part of the connector fixing member and the locking part on the board easily realizes a cost reduction.

Additionally, the connector body can be easily removed from the board only by releasing the engagement (locking) of the connector fixing part with the engaging part on the board side. Further, the locking part on the board side is provided with a socket function for electrically connecting the optical module inserted into the locking part on the board side to the board, and not only the connector body but the optical module can be easily separated from the board side. Thus, the exchange and repair of the optical module can be easily performed, and the repair cost for a defective board can be reduced.

Since a connecting method on the condition that the optical axis is tilted with resect to the board (for example, vertical direction) is employed in the present invention rather than a connecting method on the condition that the board direction is parallel with the optical axis, attachment/detachment of the connector body with/from the optical input/output end is performed by the movement of the connector body in an advance/retreat direction (contact/separation direction) with respect to the board. Thus, it is unnecessary to secure a space, where the connector body moves in the direction along the board from the optical input/output end, on the board as the conventional connecting method, and substantial attachment of the connector body can realize space saving. Thus, limitation for circuit designing on the circuit board, etc., is removed, and the degree of freedom in the mounting position of the optical module on the board and mounting density of the optical device can be raised.

The preferred embodiments of the present invention have been described above. However, the present invention is not limited to the embodiments. Addition, omission, substitution and modification to the constitution can be achieved without departing from the scope of the present invention. The present invention is not limited by the above-described embodiments, and is only limited by the scope of the appended claims.

What is claimed is:

1. An optical connector comprising:
    a board;
    an optical module which includes an optical input/output end and which is mounted on the board;
    a connector body which includes an optical axis-converting part and to which a tip of an optical fiber is attached; and
    a connector fixing member which is provided with a part to be pressed against the connector body and with engaging parts to be engaged/disengaged with/from the board or an engaging member fixed to the board and which is moved from above the board to the board such that the connector body is pressed and fixed to the optical module, so that the optical axis-converting part forms an optical path which optically connects the tip of the optical fiber and the optical input/output end.

2. The optical connector according to claim 1, wherein the connector fixing member is a frame body comprising a fixing member body having a beam part arranged along the a back surface of the connector body and the pressing part provided on the beam part, and elastic engaging pieces projected on the side of the fixing member body as the engaging part.

3. The optical connector according to claim 2, wherein the connector fixing member is a gate-shaped frame body comprising the beam part and the elastic engaging pieces projecting from both ends of the beam part as the engaging part.

4. The optical connector according to claim 2, wherein a plurality of holes, through which the elastic engaging pieces can be engaged/disengaged with/from the board, are formed in the board so as to surround both sides of the optical input/output end or the optical input/output end.

5. The optical connector according to claim 2,
    wherein the beam part is formed in a curved or bent shape, is an elastic spring body being pressed against the back surface of the connector body, and functions as a pressing part.

6. The optical connector according to claim 2, wherein an elastic spring body is attached to the beam part.

7. The optical connector according to claim 1, further comprising a pressing part which is projected on the fixing member body and is a projected piece-shaped elastic piece.

8. The optical connector according to claim 1, wherein the engaging member fixed to the board has a socket function for detachably holding an optical module attachable/detachable to/from the board.

9. The optical connector according to claim 1, wherein positioning pins projected on either the board or a positioning member fixed to the board, or the connector body, are inserted into and engaged with pin holes formed in the other respectively so that the connector body can be positioned to the optical input/output end.

10. The optical connector according to claim 1, wherein the optical module is electrically connected with solder to a circuit pattern formed on the board.

* * * * *

UNITED STATES PATENT AND TRADEMARK OFFICE
CERTIFICATE OF CORRECTION

PATENT NO. : 7,473,038 B2
APPLICATION NO. : 11/437646
DATED : January 6, 2009
INVENTOR(S) : Kunihiko Fujiwara et al.

It is certified that error appears in the above-identified patent and that said Letters Patent is hereby corrected as shown below:

Column 5, line 38, delete "ice" and insert -- face --

Signed and Sealed this

First Day of September, 2009

David J. Kappos
*Director of the United States Patent and Trademark Office*